United States Patent [19]

Raimondi, Jr.

[11] Patent Number: 5,746,388
[45] Date of Patent: May 5, 1998

[54] PHOTOGRAPHIC FILM STORAGE RECEPTACLE WITH CONSTRAINED FILM SPOOLING LOOPS

[75] Inventor: Russell J. Raimondi, Jr., Rochester, N.Y.

[73] Assignee: Eastman Kodak Company, Rochester, N.Y.

[21] Appl. No.: 668,111

[22] Filed: Jun. 21, 1996

[51] Int. Cl.$^6$ .................................................. B65H 18/04
[52] U.S. Cl. ..................... 242/595; 242/348.1; 242/348.4; 242/535.1
[58] Field of Search ....................... 242/595, 548, 242/535.1, 348.1, 348.4

[56] References Cited

U.S. PATENT DOCUMENTS

| | | |
|---|---|---|
| 1,694,401 | 12/1928 | Slocum ........................... 242/348.1 |
| 1,799,184 | 4/1931 | Slocum et al. . |
| 2,236,917 | 4/1941 | Pollock . |
| 2,336,278 | 12/1943 | Mihalyi . |
| 2,484,248 | 10/1949 | Roehrl . |
| 3,288,388 | 11/1966 | Winkler ....................... 242/348.4 X |
| 3,288,389 | 11/1966 | Gersch et al. . |
| 3,322,366 | 5/1967 | Hayden ....................... 242/348.4 X |
| 3,333,785 | 8/1967 | Baur et al. ................... 242/348.4 X |
| 3,356,311 | 12/1967 | Winkler et al. . |
| 3,645,434 | 2/1972 | Rab ............................ 242/348.4 X |
| 3,715,963 | 2/1973 | LeCover . |
| 3,718,301 | 2/1973 | Morton ....................... 242/348.1 X |
| 3,743,212 | 7/1973 | Michaels ..................... 242/535.1 X |
| 4,060,210 | 11/1977 | Norris . |
| 4,093,142 | 6/1978 | Mindell . |
| 4,166,588 | 9/1979 | Krehbiel et al. . |
| 4,285,480 | 8/1981 | Parker ........................ 242/348.1 X |
| 4,482,232 | 11/1984 | Engelsmann et al. .......... 242/348.4 X |
| 4,838,497 | 6/1989 | Kramer et al. ............... 242/535.1 |
| 5,080,297 | 1/1992 | Blaimschein .................. 242/535.1 X |
| 5,385,317 | 1/1995 | Yamamoto et al. ............. 242/595 |

FOREIGN PATENT DOCUMENTS

| | | | |
|---|---|---|---|
| 473176 | 3/1929 | Germany ....................... 242/595 |
| 622646 | 5/1949 | United Kingdom ............... 242/348.4 |

Primary Examiner—John P. Darling
Assistant Examiner—William A. Rivera
Attorney, Agent, or Firm—Francis H. Boos, Jr.

[57] ABSTRACT

A spool-free film storage receptacle having circular elastic loops mounted at each end of a cylindrical inner chamber serving to form inserted film into a rotating coil. One end of each loop is secured to the receptacle housing. The other end of each loop is slidably captured within narrow, circumferential pockets formed at each end of the chamber to constrain the loops to a well defined line of contact with the outer circumference of the coiled film.

7 Claims, 4 Drawing Sheets

PHOTOGRAPHIC FILM STORAGE RECEPTACLE WITH CONSTRAINED FILM SPOOLING LOOPS

FIELD OF THE INVENTION

This invention relates to the field of photographic film storage receptacles and in particular to spool-free film storage receptacles suitable for coiling and temporarily storing film strips at the end of film drive mechanisms employed in automated film scanners and printers.

BACKGROUND OF THE INVENTION

In automated film scanning and printing apparatus, a film drive mechanism sequentially advances a film strip along a film track through scanning and/or print stations for exposure of individual image frames to the appropriate photosensitive receiver (e.g. CCD or print paper). Short, cut film strips (four or six image frames) are usually accommodated on the film track for the entire process. For longer film strips however, it is highly desirable to provide a temporary storage receptacle at the end of the film track to take up and temporarily store the film until the scanning/printing process is completed.

U.S. Pat. No. 4,627,719 discloses a multipass film scanner/printer with large, spool-free storage receptacles at both ends of the film track. The film strip is manually inserted into the drive rollers located on the film track and, as the elongated film strip passes off the ends of the film track at the end of each pass, the film collects in loosely coiled form in the receptacles. One of the receptacles is open at the top to allow easy removal of the film at the end of the scanning and printing processes. As shown in the patent disclosure, there are no space constraints on the size of the receptacle and the film is allowed to coil up loosely in the receptacles.

In newer, more compact designs of film scanner/printers, the available space for an end-of-track film storage receptacle is severely restricted. This results in the need for a smaller interior chamber in which the film is forced to coil up on itself in a tight coil configuration. When a film is forced into a spool-free receptacle, the film initially slides against itself as it forms into the coil configuration, with the inner diameter of the coil getting smaller as film as added. The outer diameter of the film coil remains constant as determined by the inner diameter of the receptacle. A point is quickly reached however, at which the frictional resistance of the coiling film sliding against itself becomes greater than the insertion force on the film entering the receptacle. To solve this problem, numerous arrangements have been proposed that initially force the film into a coil diameter smaller than the available space in the receptacle with the film sliding against itself. Once the frictional resistance equals the insertion force, the arrangements allow the outer diameter of the film to expand, the coil simply rotating to accept the incoming film without any further sliding of the film within the coil.

Representative examples of such arrangements can be found in U.S. Pat. Nos. 3,288,389 and 3,356,311. In the '389 patent, a spool-free film cartridge is provided internally with an elastic loop, the ends of which are fixed to the cartridge mouth. As film is thrust into cartridge, it is initially coiled within the loop. Continued insertion of film causes the loop to expand to accommodate the increasing diameter of the film coil. This arrangement has a disadvantage in that the elasticity of the loop can deteriorate over time making it unsuitable for repetitive film insertions as would be encountered in film scanner printer applications. It has an additional disadvantage in that a flexible liner must be inserted between the film and the elastic loop to avoid frictional contact between the film and the loop. The '311 patent discloses a spool-free cartridge in which a helical coil spring is formed into a loop and attached at both ends to the receptacle mouth. Similarly, a looped strip is provided inside the helical coil spring loop to avoid frictional contact. The operation and disadvantages of this arrangement are the same as for the cartridge of the '380 patent.

It is further known to use a pair of parallel spring wires pivotably seated within slots formed in the cylindrical wall of a film receptacle. As seen from the side, the wires form a chord across the cylindrical cross section of the receptacle and are spaced apart laterally so as to be engaged by the outer side margins of the film entering the receptacle. The spring force of the wire is such that the film initially forms into a coil and then, as the film coil diameter expands, the wires flex outwardly in the slots to accommodate the growth in the size of the film coil. While effective for the purpose, this arrangement has a disadvantage that the outer circumference of the coil contacts the inner surface of the chamber over a substantial circumferential length thereby increasing the frictional resistance requiring greater film insertion drive force and increasing the possibility of damage to the film.

In a recently proposed film system, the side of the film opposite the emulsion bears a magnetic layer for recording of data on the film. It is important with such a system to minimize the contact of the film magnetic layer with the receptacle wall so as to minimize possible damage to the magnetic layer. Additionally, since the data is recorded in linear tracks along the margins of the film, it is highly desirable to ensure that any contact with the film outer surface is constrained to a specific contact area along the film margin that preferably does not overlap the data tracks on the film. This is to further minimize the possible loss of data caused by inadvertent scratching of the magnetic layer in the regions of the data tracks.

It is therefore an object of the invention to provide a film storage receptacle that is small in size and serves to form the incoming film into a coil with minimal contact with the film.

A further object of the invention is to provide a film storage receptacle with a coil forming arrangement that contacts the film in a constrained, well defined area so as to minimize damage to magnetic data tracks on the film.

SUMMARY OF THE INVENTION

In accordance with the invention, therefore, there is provided a film storage receptacle for forming a spool-free coil of film therein which comprises a housing having a side wall and a pair of end walls. The side wall defines a cylindrical inner chamber having an axially extending film entry slot for insertion of a film strip into the chamber and having a circumferential pocket adjacent the film entry slot. The receptacle includes a generally circular loop of elastic material shaped to provide a line contact surface with film inserted through the slot. A first end of the loop is secured to the housing at a side of the film slot opposite to the circumferential pocket so as to form the inserted film into a rotating film coil of expanding diameter within the loop. A second end of the loop is slidably captured within the pocket so as to allow the diameter of the loop to expand in concert with the film coil diameter expansion while holding a defined line of contact between the loop and the outer surface of the rotating film coil. In a preferred form of the invention, the receptacle housing includes side walls closing the ends of the cylindrical chamber with a circumferential pocket formed by the side wall and end walls at each end of the chamber and the elastic material comprises straight spring wire formed into a pair circular loops which are positioned at each end of the cylindrical chamber with the second end of each loop slidably captured in the respective pocket at the end of the chamber. By virtue of the line contact between the loop and the film maintained by the slidably captured arrangement at the end of the loop, a minimal, well defined line of contact exists between the film and the loop thereby minimizing the potential for scratching of the film surface. This is particularly important in the case of film bearing a magnetic recording layer on the side of the film that comes in contact with the loops in the receptacle. Further, the minimal resistance offered by the line contact of the loops reduces the possibility of film slip in the film printer/scanner film drive.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
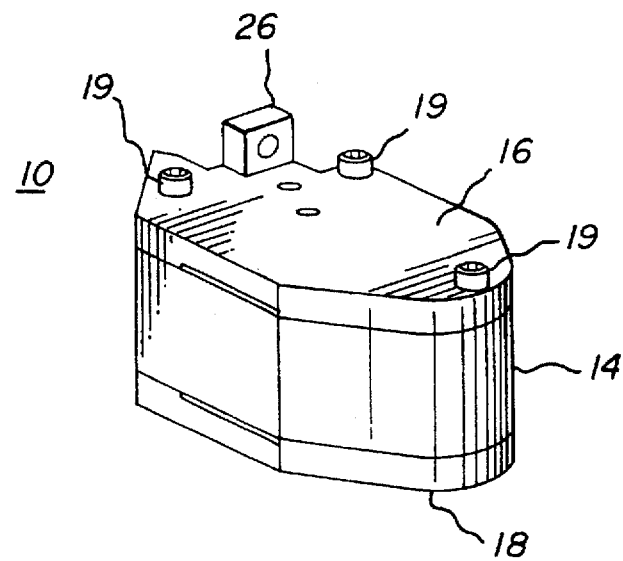
FIG. 1 is a perspective view of the film storage receptacle of the invention.
Figure 2:
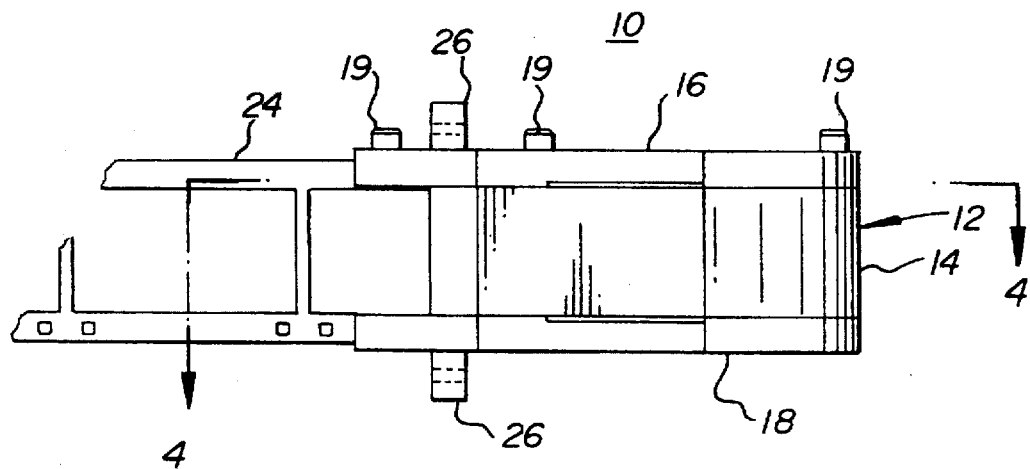
FIG. 2 is a front plan view of the receptacle of FIG. 1.
Figure 3:
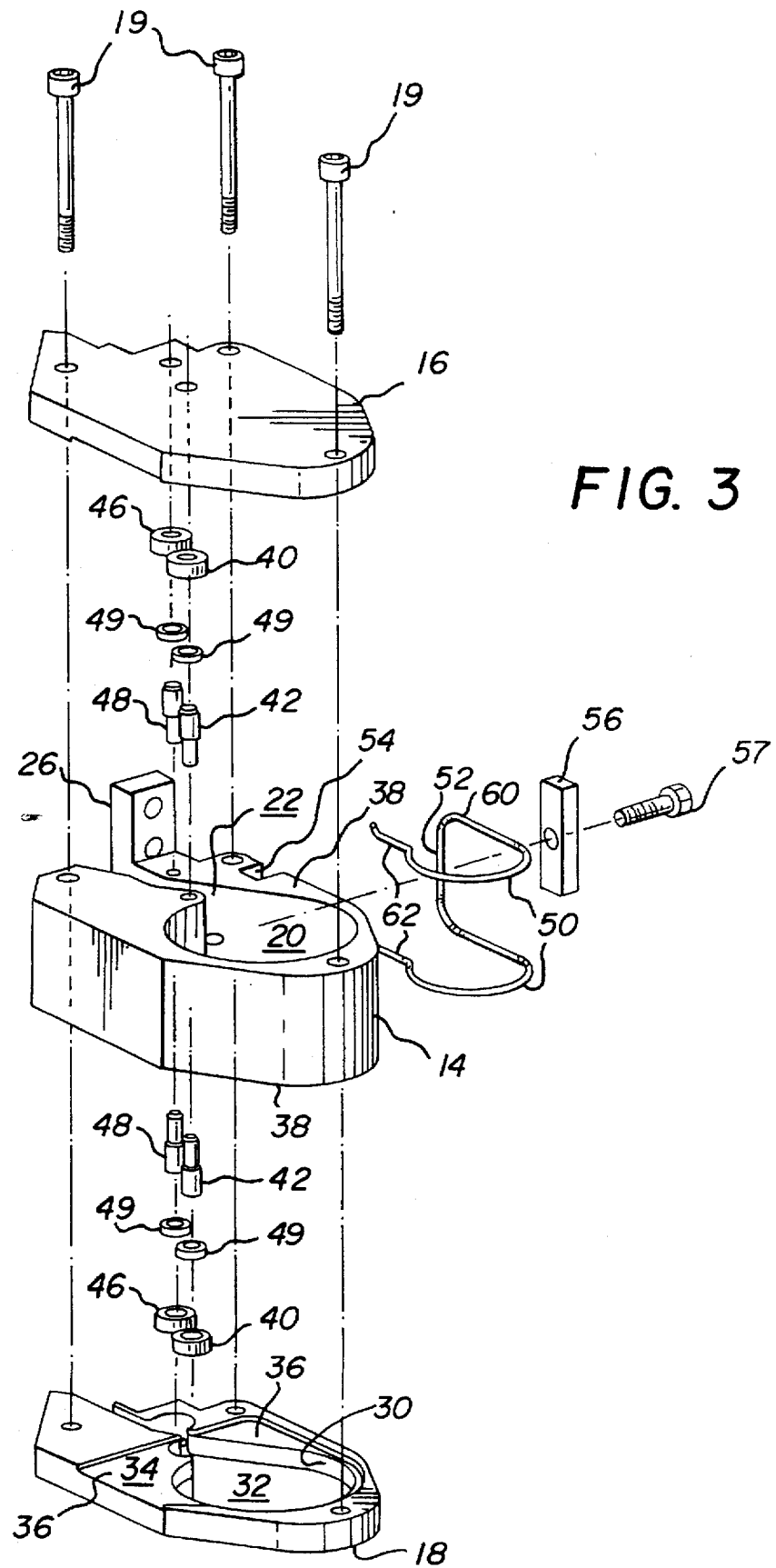
FIG. 3 is an exploded perspective view of the film storage receptacle of FIG. 1.

Referring now jointly to FIGS. 1–3, there is shown a film storage receptacle 10 comprising a housing 12 formed by a central core side wall 14 and end walls 16 and 18. The end walls may be affixed to the side wall 14 by means of bolts 19 or by other suitable means such as an adhesive. The side wall 14 defines a generally cylindrical inner chamber 20 which is provided with an axially extending film entry slot 22 allowing for insertion of film 24 into the chamber 20 from an adjacent film drive track (not shown) to which the receptacle 20 is attached by means of a mounting flange 26 and bolt fasteners (not shown).

Figure 4:
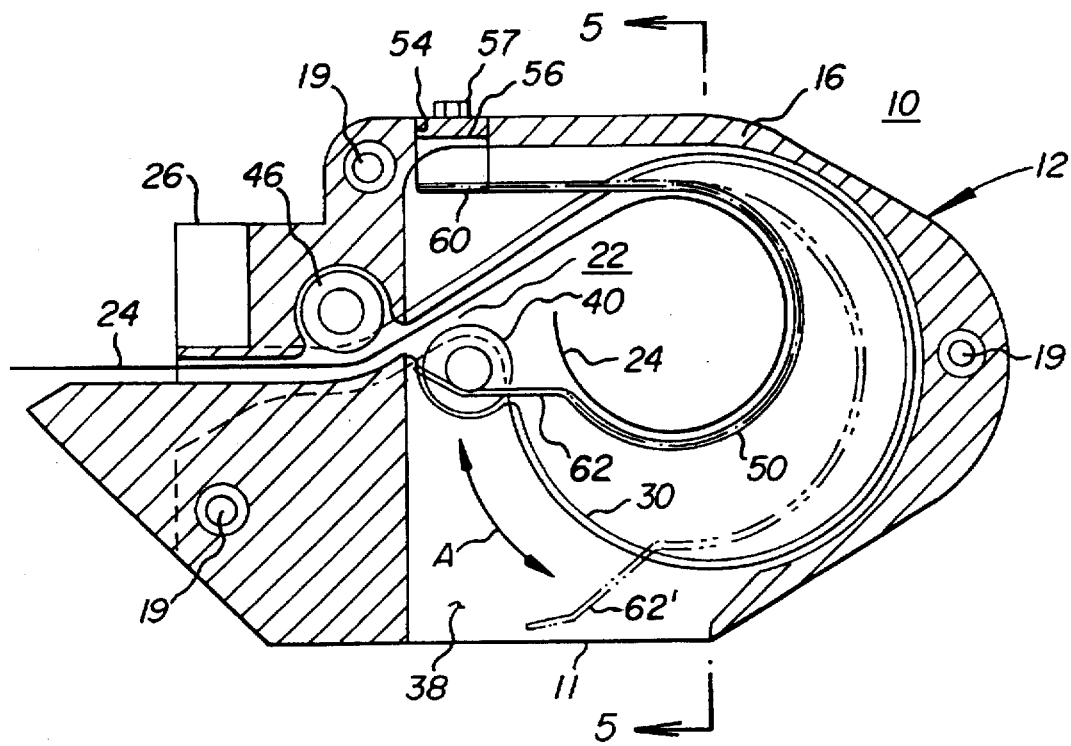
FIG. 4 is a top view of the receptacle taken along the cross section shown in FIG. 2.
Figure 5:
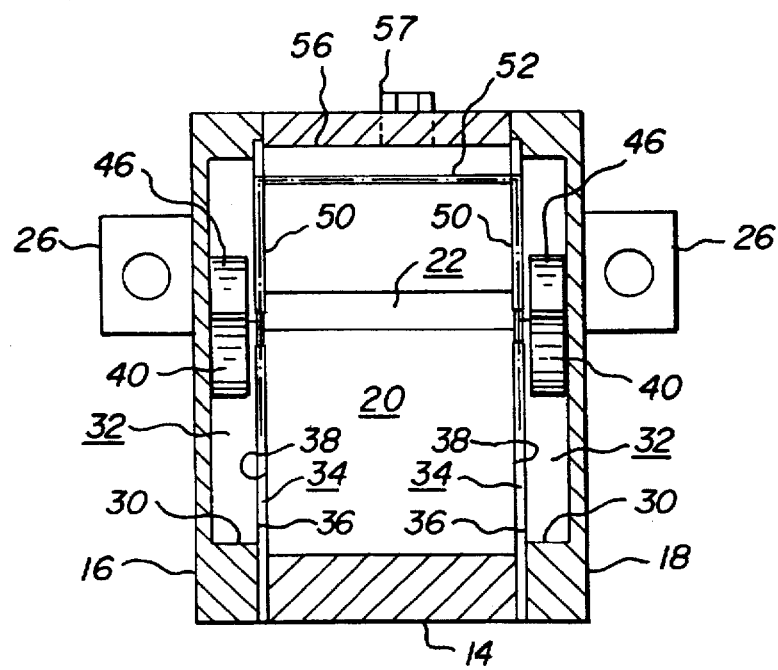
FIG. 5 is an end view of the receptacle taken along the cross section shown in FIG. 4.

Referring now more specifically to FIGS. 3–5, the inner faces of end walls 16 and 18 are provided with a stepped recess to form a first recessed area 32 having a generally circular guide rail surface 30 and a second area forming a slender pocket region 34 between the end face 38 of central core side wall 14 and the opposing recessed face 36 of the end walls 16 and 18. At the film entry slot 22, a first pair of spaced apart rollers 40 are journalled on axle pins 42 set into the central core wall 14. A second pair of spaced apart rollers 46 are similarly journalled on axle pins 48 set into the core wall 14 on the opposite side of entry slot 22 and slightly forward of the first rollers 40. Spacers 49 are inserted on the pins 42,48 between the rollers and the end face 38 to assure free rotation of the rollers. When assembled, the rollers are positioned in the recessed area 32 as shown in FIG. 5.

The film storage receptacle further includes at least one and preferably a pair of generally circular loops 50 of elastic material, such as spring wire, that are spaced apart and positioned at each end of the cylindrical chamber 20. As shown in the illustrated embodiment, the loops are formed from a single, continuous spring wire with an intermediate spacer section 52. When assembled, the spacer section 52 is nested into a channel 54 and clamped therein by a bar 56 held in place by a bolt 57. Thus, the first ends 60 of the loops 50 are secured to the housing 12 at a side of film slot 22 opposite to the pocket region 34. In this way, as film is inserted into the receptacle, the loops 50 form the film into a rotating film coil of expanding diameter within the loop circumference. The second, opposite ends of the loops 50 are bent generally radially outwardly from the center of the loops to form sections 62 that extend into and are slidably captured within the pocket regions 34.

In the unstressed configuration of the loops, the outwardly extending sections 62 are stopped against the spacers 49 between rollers 40 the central core wall 14. As the film is coiled up within the cylindrical chamber, the end sections 62 move freely within the pocket regions 34, as shown by arrow A, allowing the spring loops 50 to flex outwardly as film coil diameter expands, as indicated by the phantom line position 62'. When the leading edge of the strip of film 24 is inserted into the receptacle 10, it first engages the pair of rollers 40 which lifts the film into contact with rollers 46. As film insertion continues, the joint action of rollers 40,46 against the film causes the lateral curl of the film to become straightened which facilitates entry of the film into the cylindrical chamber 20 and the formation of the film into a coil within the spring loops 50. Moreover, by virtue of the fact that the first ends of the loops 50 are fixed and the second ends are slidably captured within the pocket regions 34, a well defined line of contact is held between the spring loops 50 and the outer circumferential surface of the film coil. This virtually eliminates side flexure of the spring loops and reduces significantly the chance of damaging the film surface which is of particular importance in the case where the film surface is a magnetic layer on which data has been recorded.

Figure 6:
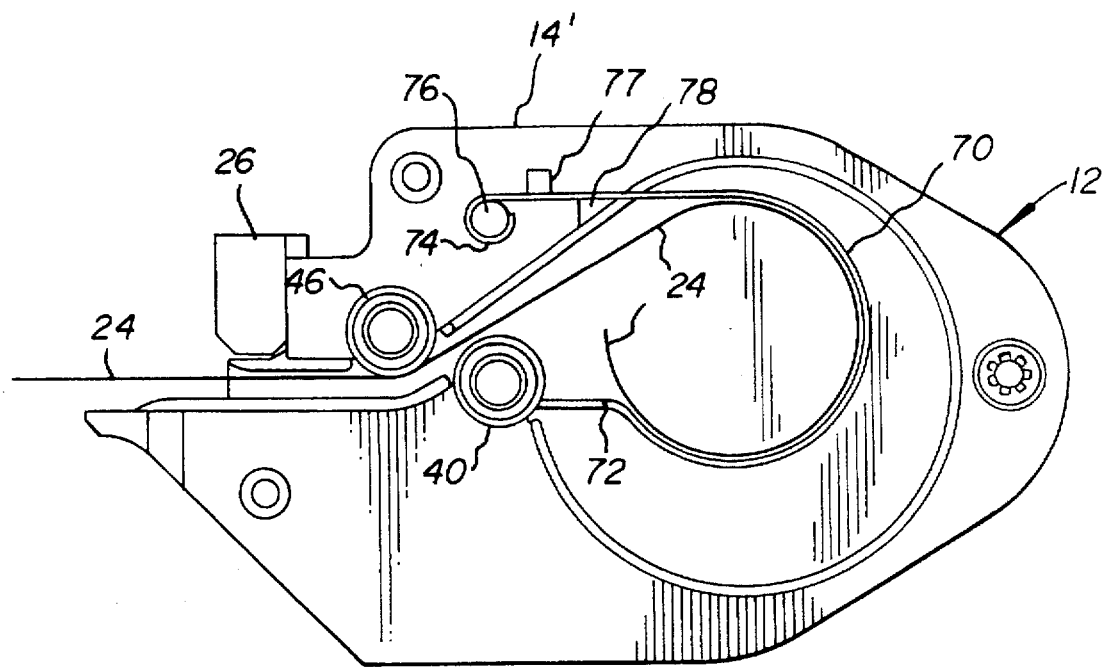
FIG. 6 is a side view of a film receptacle according to the invention showing an alternative mounting arrangement of spring loops in the receptacle.

In FIG. 6, an alternative arrangement for mounting of the spring loops to the central core wall is shown. In this arrangement, each end face 38 of central core wall 14' is provided with bosses 76,77,78 extending outwardly from the end face. The spring loops 70 comprise separate loops having the first ends formed in a circle to fit over boss 76. The straight section of the loop nearest the first end is inserted between bosses 77 and 78 and thereby frictionally retained on the end face of the core wall until the end cap is attached in place thereby securing the first ends of the loops to the central core wall. The second ends 72 of the loops 70 are slidably captured within the recessed pocket in the same manner as described above. This arrangement of mounting the loops on the core wall offers improved manufacturability over the single wire arrangement of FIG. 3.

Figure 7:
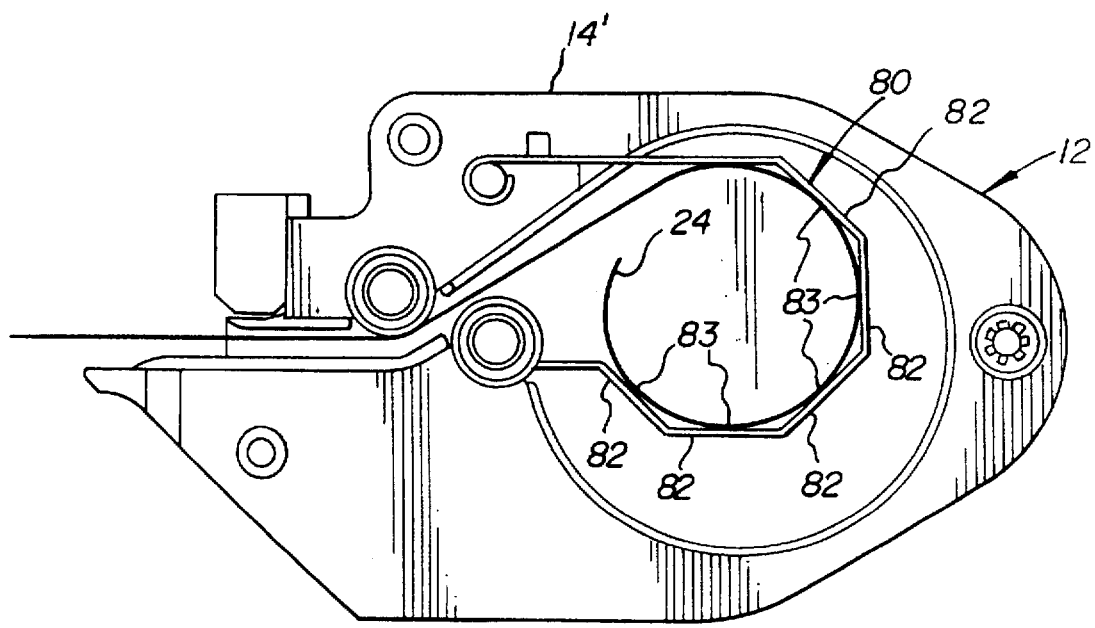
FIG. 7 is a side view of a film receptacle according to the invention showing an alternative configuration of spring loops in the receptacle.

In FIG. 7, an alternative embodiment of the receptacle is shown in which loop 80, although generally circular, is actually shaped as a plurality of straight sections 82 which are tangential to the circumference of a circle corresponding to the outer circumference of the coil of film 24. With this arrangement, the contact between each loop 80 and the outer surface of film 24 is reduced to the tangent points 83 thereby further reducing the frictional contact between the loops and the film. The loop 80 is mounted to the housing in the same manner as described above.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | film storage receptacle |
| 12 | receptacle housing |
| 14 | central core side wall |
| 16 | end wall |
| 18 | end wall |
| 20 | cylindrical inner chamber |
| 22 | film entry slot |
| 24 | film |
| 26 | receptacle mounting flange |
| 30 | guide rail surface |
| 32 | first recessed area |
| 34 | pocket region |
| 36 | end cap recessed face |
| 38 | end face of central core wall 14 |
| 40 | first pair of rollers |
| 42 | axle pins |
| 46 | second pair of rollers |
| 48 | axle pins |
| 49 | roller spacers |
| 50 | circular loops |
| 52 | intermediate spacer section |
| 54 | channel |
| 56 | clamp bar |
| 57 | bolt |
| 60 | first ends of loops 50 |
| 62 | second end sections of loops 50 |
| 70 | spring loops |
| 72 | second end section of loops 70 |
| 74 | first ends of loops 70 |
| 76 | boss |
| 77 | boss |
| 78 | boss |
| 80 | circular loop |
| 82 | straight sections of loop 80 |
| 83 | tangent points |

What is claimed is:

1. A photographic film storage receptacle for forming a spool-free coil of film therein comprising:

a housing having a side wall and a pair of end walls, said side wall defining a generally cylindrical inner chamber having an axially extending film entry slot for insertion of a film strip into the chamber, said housing having a circumferential pocket at an end of said cylindrical chamber adjacent said film entry slot; and a generally circular loop of elastic material having an expandable diameter, said loop having a first end secured to said housing at a side of said film slot opposite to said pocket so as to form said inserted film into a rotating film coil of expanding diameter within the loop and a second end slidably captured within said pocket so as to allow the diameter of said loop to expand in concert with the film coil diameter expansion while holding a defined line of contact between the loop and the outer surface of the rotating film coil.

2. The film storage receptacle of claim 1 wherein said housing includes a circumferential pocket defined by said side and end walls at each end of the cylindrical chamber; said receptacle including a circular loop at each end of the chamber with said second end of each loop being slidably captured within a respective one of said pockets.

3. The film storage receptacle of claim 1 or 2 wherein said loops comprise straight spring wire formed into said circular loop.

4. The film storage receptacle of claim 2 wherein said loops comprise straight spring wire formed from a single spring wire into a pair of circular loops spaced apart by an intermediate section such that said loops lie in parallel planes at opposite ends of the cylindrical chamber; and said receptacle includes a clamp to secure said intermediate section to the housing.

5. The film storage receptacle of claim 2 wherein said loops comprise separate independent circular loops formed from straight spring wire and said first ends of said loops are independently secured to said housing at opposite ends of the cylindrical chamber.

6. The film storage receptacle of claim 4 or 5 wherein the second end of each of said loops includes a section extending generally radially outward into said circumferential pockets.

7. The film storage receptacle of claim 1 wherein said loop is shaped as a plurality of straight sections tangential to the circumference of a circle corresponding to the outer circumference of said film coil.

* * * * *

UNITED STATES PATENT AND TRADEMARK OFFICE
CERTIFICATE OF CORRECTION

PATENT NO. : 5,746,388
DATED : May 5, 1998
INVENTOR(S) : Raimondi, Jr.

It is certified that error appears in the above-identified patent and that said Letters Patent is hereby corrected as shown below:

Title page, insert the following item:

-- [60] Provisional application No. 60/007,259 filed Nov. 6, 1995. --

Column 1, line 4, insert the following:

-- CROSS REFERENCE TO RELATED APPLICATION: Reference is made to and priority claimed from U.S. provisional application Ser. No. 60/007,259, filed Nov. 6, 1995, entitled PHOTOGRAPIC FILM STORAGE RECEPTACLE --

Signed and Sealed this

Twenty-fifth Day of August, 1998

*Attest:*

BRUCE LEHMAN

*Attesting Officer*  *Commissioner of Patents and Trademarks*